United States Patent
Koh et al.

(10) Patent No.: US 7,457,541 B2
(45) Date of Patent: Nov. 25, 2008

(54) SYSTEM FOR INTEGRATING BROADCASTING AND COMMUNICATION TECHNOLOGIES WHILE ENSURING QUALITIES OF SERVICES

(75) Inventors: Jun-Ho Koh, Suwon-shi (KR); Yun-Je Oh, Yongin-shi (KR); Chan-Yul Kim, Puchon-shi (KR); Seung-Jin Lee, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 637 days.

(21) Appl. No.: 10/645,188

(22) Filed: Aug. 21, 2003

(65) Prior Publication Data

US 2004/0161236 A1    Aug. 19, 2004

(30) Foreign Application Priority Data

Feb. 10, 2003    (KR) ................... 2003-8246

(51) Int. Cl.
*H04B 10/00*    (2006.01)

(52) U.S. Cl. .................. 398/72; 398/71; 398/98; 398/100

(58) Field of Classification Search ............. 398/66–73, 398/98–100
See application file for complete search history.

(56) References Cited

U.S. PATENT DOCUMENTS

| | | | | |
|---|---|---|---|---|
| 4,763,317 A | * | 8/1988 | Lehman et al. ............. 370/358 |
| 5,808,767 A | * | 9/1998 | Williams et al. ............... 398/70 |
| 6,400,720 B1 | * | 6/2002 | Ovadia et al. .......... 370/395.64 |
| 6,567,429 B1 | * | 5/2003 | DeMartino ................... 370/539 |
| 6,763,025 B2 | * | 7/2004 | Leatherbury et al. ... 370/395.64 |
| 2002/0093969 A1 | * | 7/2002 | Lin et al. .................... 370/401 |
| 2003/0097661 A1 | * | 5/2003 | Li et al. ....................... 725/109 |

FOREIGN PATENT DOCUMENTS

| | | |
|---|---|---|
| JP | 2000-036828 | 2/2000 |
| JP | 2002-217934 | 8/2002 |

* cited by examiner

*Primary Examiner*—Agustin Bello
(74) *Attorney, Agent, or Firm*—Cha & Reiter, LLC

(57) ABSTRACT

A system for integrating broadcast and communication technologies includes an optical-line terminal (OLT), a optical-network unit (ONU) and a user gateway, wherein a broadcast signal is processed on the basis of time division multiplexing (TDM) such that the quality of a broadcast service can be ensured. The ONU separates the optical signal transmitted from the OLT into the broadcast signal and the communication signal, processes upstream information transmitted from a user, and optically transmits the broadcast signal and the communication signal selected on a user-by-user basis, on the basis of a time slot. The user gateway opto-electrically converts a time slot-based optical signal transmitted from the ONU, separates the time slot-based optical signal into individual signals, distributes the individual signals on a service-by-service basis, and optically transmits the upstream information from the user to the ONU.

7 Claims, 3 Drawing Sheets

SYSTEM FOR INTEGRATING BROADCASTING AND COMMUNICATION TECHNOLOGIES WHILE ENSURING QUALITIES OF SERVICES

CLAIM OF PRIORITY

This application claims priority to an application entitled "SYSTEM FOR INTEGRATING BROADCAST AND COMMUNICATION TECHNOLOGIES, WHICH ENSURES QUALITIES OF SERVICES," filed in the Korean Intellectual Property Office on Feb. 10, 2003 and assigned Serial No. 2003-8246, the contents of which are hereby incorporated by reference.

BACKGROUND OF THE INVENTION

1. Field of the Invention

The present invention relates to a system for integrating broadcasting and communication technologies and, in particular, to a sending and receiving system which facilitate the implementation of processing broadcast signals within an optimal level of quality of services.

2. Description of the Related Art

In general, broadcasting is characterized as a one-way transmission for reception by a group of unspecified viewers. A service provider and a network provider are the same entity for the provision of such broadcasts. In the conventional broadcasting, all broadcast channels are transmitted to viewers so that the viewers can select their desired channels through a set-top box, for example. As such, in this broadcasting scheme, unnecessary channels are transmitted to the broadcast-receiving apparatus.

In contrast, a general communication service is characterized as a two-way transmission involving point-to-point transmission and reception of messages. Unlike the broadcasting technique, the service provider and the network provider are different.

The different characteristics and implementation of the respective technologies described above and others are listed in the following Table 1.

TABLE 1

| Classification | Broadcast | Communication |
| --- | --- | --- |
| Receiver | Multiple of unspecified persons | Specified person |
| Fee | Not charged | Charged |
| Direction | One-way transmission | Two-way transmission |
| Contents | Public | Private |
| Service and network providers | Same | Different |

Traditionally, broadcasts were provided through a broadcast network while communication was performed through a communication network. Nowadays, broadcasts can be provided through a communication network, and vice versa. Thus, different broadcast and communication networks have converged in the form of integrated networks, i.e., satellite broadcasting using a communication satellite, a cable-television (CATV) network, a telephony business using a CATV network, data or paging-signal transmission using a ground wave for broadcast, etc. In addition, there is a growing trend of convergence of services where a broadcast service and a communication service are merged. With the development of ever-growing multimedia techniques, a new service having intermediate characteristics between the conventional broadcast and communication services has been developed. For example, one exemplary new service having the intermediate characteristics includes a data-casting service, a video-conference service, a video-on-demand (VOD) service, etc. As a result, the conventional media can be used in newer ways, including telemarketing, fax advertisement, etc.

Therefore, there is a need for a system for combining the broadcast and communication technologies using a CATV network from an aspect of a broadcaster, and a system for combining the broadcast and communication technologies based on an Internet protocol (IP) using a very high-speed, digital-subscriber-line (VDSL) network, etc., from an aspect of a communication carrier.

FIG. 1 is an exemplary broadcast and communication-integration system using a conventional cable-television (CATV) network. As shown, the integration system includes an optical line terminal (OLT) 100 located between a user 300 and a service node, which receives a broadcast signal from a broadcaster and a communication signal from a communication carrier in order to provide the integrated broadcast and communication services, such as a digital-broadcast service, an analog-broadcast service, a voice-telephone service, a video service, a high-speed Internet service, etc., to the user 300. The functions of OLT 100 include electro-optically converting the received broadcast and communication signals, combining the converted broadcast and communication signals to form a single optical signal, and sending the combined optical signal. Further, an optical-network unit (ONU) 200 is provided at the user side for sending an optical signal from the OLT 100 to the user 300. To this end, an optical cable connected between the OLT 100 and the ONU 200 and a two-way hybrid-fiber coaxial (HFC) network connected between the ONU 200 and the user 300 are provided.

According to the configuration above, the broadcast and communication-integration system using the CATV network must optically transmit a sub-carrier analog signal so that data can be transmitted. To improve the efficiency of transmission, the system has adopted a complex modulation scheme such as 64-quadrature amplitude modulation (QAM).

Note that a user-connection network is configured in the form of a coaxial cable, and its transmission bandwidth is limited to approximately 900 MHz. As the broadcast typically transmits all broadcast channels to all subscribers, the bandwidth utilization is not optimal. Meanwhile, a communication-service field provides the Internet, video-on-demand (VOD), etc., using a cable modem; thus each subscriber is forced to share the limited bandwidth. Accordingly, there is a problem of inefficient usage of bandwidth as the number of subscribers increases.

FIG. 2 is an exemplary broadcast and communication-integration system based on an Internet protocol (IP) associated with a conventional communication carrier. As shown, the integration system based on the IP using an x digital-subscriber-line (xDSL) network includes an optical-line terminal (OLT) 100 located between a user 300 and a service node for receiving a broadcast signal from a broadcaster and a communication signal from a communication carrier so that services such as a digital-broadcast service, an analog-broadcast service, a voice-telephone service, a video service, a high-speed Internet service, etc., are available to the user 300. An optical cable is connected between the OLT 100 and the ONU 200, and a high-speed subscriber-line (VDSL) network made of a copper line is connected between the ONU 200 and the user 300.

The integration system based on the IP using the xDSL network is configured to transmit at a unit of a packet. Thus, the system is unable to provide the seamless broadcast. In particular, a time delay can occur since a process for linking the packets is needed. For this reason, it is difficult for the broadcast to be transmitted and processed in real time. Therefore, the IP-based integrated system is unable to meet the current demand for high quality of the broadcast service. In addition, as the xDSL uses a copper line as a transmission medium, the bandwidth is limited due to the copper line's physical characteristics.

Accordingly, there is a need for an improved integrated system capable of overcoming the above-described problems and which provides additional advantages.

SUMMARY OF THE INVENTION

The present invention relates to a broadcast and communication-integration system for realizing a connection between an optical-network unit (ONU) and a user as well as a connection between an optical-line terminal (OLT) and the ONU using an optical line, such that a broadcast signal can be processed on the basis of a time-division-multiplexing (TDM) scheme to ensure the quality of a broadcast service.

One aspect of the present invention is to provide a broadcast and communication-integration system, which ensures qualities of services, while reducing bandwidth-usage inefficiency due to unnecessary data transmission of sending all broadcast channels to only a single optical-network unit (ONU), by enabling a signal of at least one channel to be selected by a user for reception.

Another aspect of the present invention provides a system for integrating broadcast and communication technologies while it ensures the qualities of services. The system includes: an optical-line terminal (OLT) for receiving at least one digital-broadcast signal through an external broadcast network and at least one external data-communication signal, for electro-optically converting the received signals, for combining the electro-optically converted signals to form an optical signal, and for transmitting the optical signal on the basis of optical wavelength-division multiplexing (WDM); an optical-network unit (ONU) for separating the optical signal transmitted from the OLT into the broadcast signal and the communication signal, for processing upstream information transmitted from a user, and for optically transmitting the broadcast signal and the communication signal selected on a user-by-user basis on the basis of a time slot; and, a user gateway for opto-electrically converting a time slot-based optical signal transmitted from the ONU, for separating the time slot-based optical signal into individual signals, for distributing the individual signals on a service-by-service basis, and for optically transmitting the upstream information from the user to the ONU.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

Figure 1:
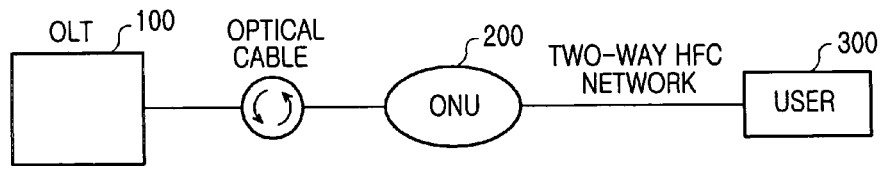
FIG. 1 is an exemplary broadcast and communication-integration system using a conventional cable-television (CATV) network.
Figure 2:
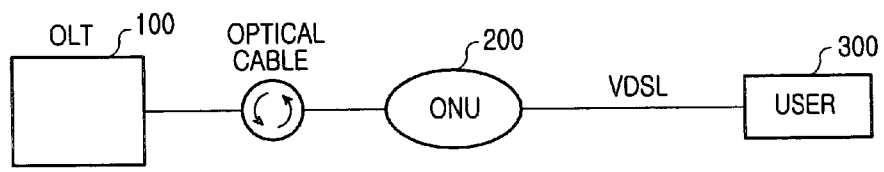
FIG. 2 is an exemplary broadcast and communication-integration system based on an Internet protocol (IP) associated with a conventional communication carrier.

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention rather unclear.

Figure 3:
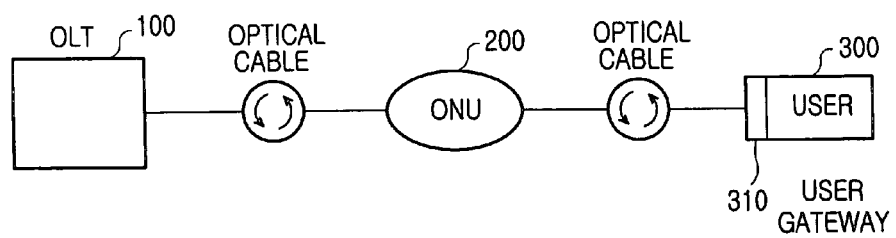
FIG. 3 is an exemplary configuration of a broadcast and communication-integration system for ensuring the qualities of services in accordance with the present invention.

FIG. 3 is a simplified diagram of a broadcast and communication-integration system capable of ensuring the qualities of services in accordance with the present invention. As shown in FIG. 3, the integration system in accordance with the present invention includes an optical-line terminal (OLT) 100, which is a subsystem located between a user 300 and a service node, for receiving a broadcast signal from a broadcaster and a communication signal from a communication carrier. The type of services that the user 300 receives via the OLT 100 includes a digital-broadcast service, an analog-broadcast service, a voice-telephone service, a video service, a high-speed Internet service, etc., to the user 300. The OLT 100 serves the functions of electro-optically converting the received broadcast and communication signals and combining and transmitting the converted signals in the form of a single optical signal.

The integration system further includes an optical-network unit (ONU) 200, disposed at the user side, for sending the optical signal from the OLT 100 to the user 300 according to an assigned time slot; a first optical cable connected between the OLT 100 and the ONU 200; and, a second optical cable connected between the ONU 200 and the user 300.

To perform an optical transmission based on a wavelength-division-multiplexing (WDM) scheme between the OLT 100 and the ONU 200, the OLT 100 multiplexes broadcast signals optically into a synchronous-digital-hierarchy (SDH)/synchronous-optical-network (SONET) signal based on a time-division-multiplexing (TDM) technique, so that the quality of service (QoS) for the broadcast signal can be ensured. Hence, the OLT 100 optically multiplexes communication signals into a Gigabit-Ethernet signal.

In the embodiment, the OLT 100 uses the SDH/SONET signal based on the TDM scheme to ensure the quality of the broadcast service since the broadcast signals must be seamlessly provided in the broadcast service field. Normally, that a packetization is carried out to transmit data in units of packets, and a packet-processing operation for linking the preceding and subsequent packets is required after the packetization process. To this regard, a buffer and a delay are utilized to process the packets. Therefore, in the broadcast service as described above, a process based on the TDM is incorporated in the present invention or a real-time broadcasting and a linkage of seamless broadcast signals.

As an optical signal transmitted through the OLT 100 is transferred to the user 300 through the ONU 200, the ONU 200 demultiplexes the optical signal transmitted from the OLT 100, then separates the optical signal into a broadcast signal and a communication signal. Thereafter, the ONU 200 processes the broadcast and communication signals and multiplexes the broadcast and communication signals into an optical signal according to assigned time slot, and finally transfers the optical signal to the user 300. At the same time, the ONU 200 also serves to transfer a signal from the user 300 to the OLT 100 in a reverse direction. These operations steps will be described hereinafter in detail with reference to FIGS. 4 and 5.

Figure 4:
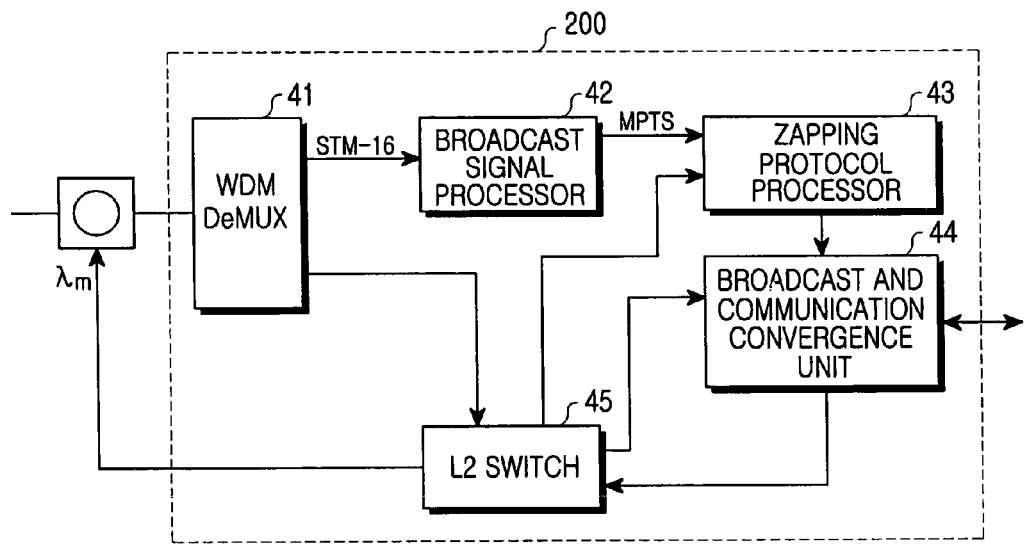
FIG. 4 is a detailed configuration of an optical-network unit (ONU) included in the broadcast and communication-integration system for ensuring the qualities of services in accordance with the present invention.

FIG. 4 is a detailed configuration of the ONU 200 shown in FIG. 3. As shown, the ONU 200 includes a WDM optical demultiplexer (WDM DeMUX) 41 for separating a WDM optical signal transmitted from the OLT 100; a broadcast-signal processor 42 for opto-electrically converting at least one broadcast signal separated from the WDM optical signal by the WDM optical demultiplexer 41 and outputting the opto-electrically converted broadcast signal; a zapping-protocol processor 43 for selecting information of at least one channel desired by the user from broadcast signals of all channels outputted from the broadcast signal processor 42; an L2 switch 45 for electro-optically converting at least one communication signal separated from the WDM optical signal by the WDM optical demultiplexer 41 in order to output the electro-optically converted communication signal, electro-optically converting the Ethernet upstream information transmitted by the user 300 to output the converted Ethernet-upstream information to the OLT 100, and transferring digital-broadcast-channel information selected by the user 300 to the zapping-protocol processor 43; and, a broadcast and communication-convergence unit 44 for outputting, in the form of an optical signal based on the assigned time slot, a digital-broadcast signal outputted from the zapping -protocol processor 43 and a communication signal outputted from the L2 switch 45 and transferring the Ethernet-upstream information from the user to the L2 switch 45.

In operation, the WDM optical demultiplexer 41 separates signals on a wavelength-by-wavelength basis by demultiplexing the WDM optical signal transmitted from the OLT 100. The WDM optical demultiplexer 41 separates a digital-broadcast signal (based on a synchronous-transfer mode (STM)-16) and communication data including Internet data and VOD data from the WDM optical signal. The separated signal and data are transferred to respective corresponding processors. Alternatively, if the OLT 100 multiplexes and transmits analog-broadcast signals (not shown in FIG. 4), the analog-broadcast signals demultiplexed and separated by the WDM optical demultiplexer 41 are transferred to the broadcast and communication-convergence unit 44, while the analog-broadcast signals are overlaid to an optical signal based on the assigned time slot and transferred to the user 300.

The broadcast-signal processor 42 receives and electro-optically converts an STM-16 signal being an SDH/SONET signal, processes the electro-optically converted signal on the basis of an MPEG2 multi-program transport stream (MPTS), and transfers the processed signal to the zapping-protocol processor 43. In this case, digital-broadcast signals of all channels are processed. In the embodiment of the present invention, the STM-16 signal being one of SDH signals is used as the SDH/SONET signal. However, it is noted that the present invention is not limited to the STM-16 signal, thus a signal of an STM-64 or higher can be used in the present invention. Alternatively, a synchronous-transfer signal level-n (STS-n) signal can be used as the SONET signal.

The zapping-protocol processor 43 receives digital-broadcast signals for all channels from the broadcast-signal processor 42, receives information of at least one channel selected by the user 300 from the L2 switch 45, and transfers only at least one digital-broadcast signal selected by the user among all digital-broadcast signals to the broadcast and communication-convergence unit 44. In this case, a protocol for selecting a broadcast signal conforms to a related standard. Thus, for simplicity, the related standard will not be described in detail.

The broadcast and communication-convergence unit 44 multiplexes a digital-broadcast signal outputted from the zapping-protocol processor 43 and a communication signal outputted from the L2 switch 45 into an optical signal on a time slot and then outputs the optical signal. The broadcast and communication-convergence unit 44 also receives the Ethernet-upstream information from the user 300 and then outputs the Ethernet-upstream information to the L2 switch 45.

Figure 5:
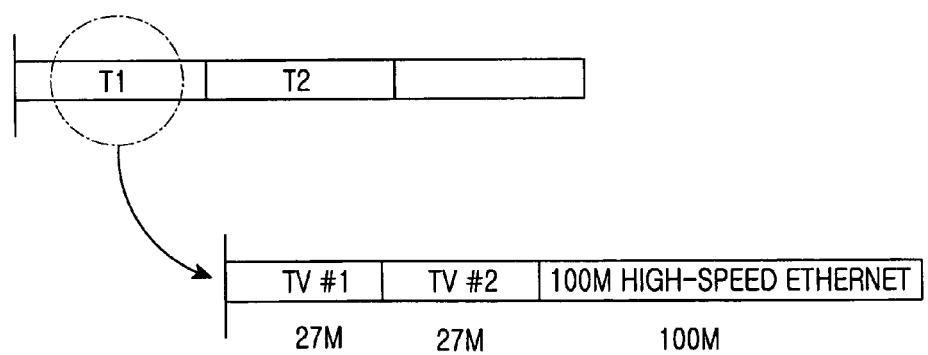
FIG. 5 is a structure of the data based on a time-slotted reception/transmission of the broadcast and communication-integration system for ensuring the qualities of services in accordance with the present invention; and, FIG. 6 is a detailed configuration of a user gateway included in the broadcast and communication-integration system for ensuring the qualities of services in accordance with the present invention.

Note that the broadcast and communication signals are multiplexed into the optical signal based on the time slot as the optical signal must be processed in real time to ensure the quality of the broadcast service. To ensure the quality of the broadcast service, a process based on the TDM is needed. An example of a continuous time slot is shown in FIG. 5. As shown, the configuration of two digital-broadcast data items and one high-speed Ethernet data is exemplified for illustration purposes. That is, a time slot is assigned to the digital-broadcast data TV #1 of 27 M, digital-broadcast data TV #2 of 27 M, and high-speed Ethernet data of 100 M. Thus, in this example, the user 300 is able to receive the high-speed data communication of 100 M and view two digital broadcasts of a high-definition (HD) class. Note that the user 300 can view additional digital broadcasts by adding TV #3, TV #4, etc., continuously in the remaining bandwidth. In the case of the high-speed Ethernet, the high-speed Ethernet data is limited to 100 M and can use a capacity of 1 gigabyte (G).

Meanwhile, the L2 switch 45 opto-electrically converts the communication signal separated from the WDM optical signal by the WDM optical demultiplexer 41, outputs the opto-electrically converted communication signal to the broadcast and communication-convergence unit 44, electro-optically converts the Ethernet-upstream information transferred from the user 300 through the broadcast and communication-convergence unit 44, and transfers the electro-optically converted information to the OLT 100. Further, the user's digital-broadcast-channel information transferred from the broadcast and communication-convergence unit 44 is transferred to the zapping-protocol processor 43 via the L2 switch 45.

Finally, the optical signal transmitted by the ONU 200 to the user 300 based on the assigned time slot is distributed to each user device using a user gateway 310. The function of the gateway 310 will be described hereinafter in detail with reference to FIG. 6.

Figure 6:
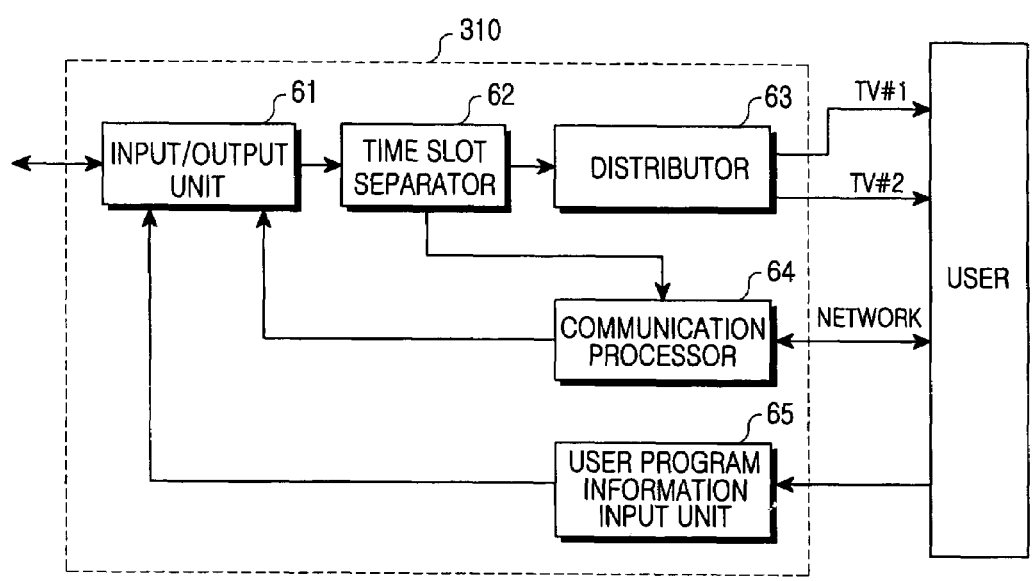

FIG. 6 is a detailed configuration of a user gateway 310 included in the broadcast and communication-integration system in accordance with the present invention. As shown, a user gateway 310 includes an input/output unit 61 for receiving an optical signal from the ONU 200, opto-electrically converting the optical signal received thereon, and electro-optically converting upstream information from the user 300 to transmit the converted upstream information to the ONU 200; a time-slot separator 62 for separating a time slot-based signal output from the input/output unit 61 into broadcast and communication signals; a distributor 63 for distributing the broadcast and communication signals to corresponding devices; a communication processor 64 for transferring the communication signal output from the time slot separator 62, and transferring the upstream information from the user 300 to the input/output unit 61; and, a user-program-information-input unit 65 for transferring information of at least one broadcast channel selected by the user to the input/output unit 61. In an alternate embodiment, if an analog-broadcast signal is transmitted, the input/output unit 61 opto-electrically converts the analog-broadcast signal and transfers it to the distributor 63. Then the distributor 63 transfers the signal to an analog-broadcast device.

As apparent from the above description, the present invention provides a broadcast and communication-integration system capable of providing a broadcast service such as a digital-broadcast service and a communication service such as a video-on-demand (VOD) service, an Internet service, etc., simultaneously to a user, while ensuring the desired quality of services. In accordance with the present invention, time-division multiplexing (TDM) for data can be performed and the TDM-based data can be transmitted during broadcasting, without the use of a complex modulation scheme (quadrature-amplitude modulation (QAM)) for achieving the bandwidth efficiency as in conventional digital-broadcast equipment. Thus, the inventive integration system can be inter-worked with a synchronous-optical network (SONET)/ conventional synchronous digital hierarchy (SDH) network. As the TDM-based broadcast signal is transmitted, a high quality of service based on the TDM is realized. In addition, the optical-network unit (ONU) according to the teachings of the present invention carries out a zapping-protocol process and transmits at least one channel selected by a subscriber, without sending all broadcast channels to subscribers and allowing a subscriber to select at least one broadcast channel, thereby maximally utilizing the transmission bandwidth. Furthermore, the optical-line terminal (OLT) in the present invention adopts a wavelength division multiplexing (WDM)-based optical-transmission scheme, thus readily extending bandwidth by adding an optical channel.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A system for integrating broadcast and communication technologies, comprising:
   an optical-line terminal (OLT) for receiving one or more broadcast signals and one or more external data-communication signals, for converting the received signals and for combining the converted signals in the form of an optical signal, and transmitting the optical signal according to an optical wavelength-division multiplexing (WDM);
   an optical-network unit (ONU) for separating the optical signal transmitted from the OLT into the one or more broadcast signals and the one or more communication signals and transmitting only the broadcast signal(s) selected by a user from said one or more broadcast signals and the communication signals, which are time division multiplexed during broadcasting without being modulated in an optical output signal from the ONU according to a predetermined continuous time slot assigned to the user for processing the broadcast signals in real time; and,
   a user gateway for distributing the optical output signal from the ONU to the user;
   wherein the ONU comprises:
   a WDM optical demultiplexer for demultiplexing the signal output from the OLT;
   a broadcast-signal processor for converting the broadcast signal demultiplexed by the WDM optical demultiplexer opto-electrically;
   a zapping-protocol processor for outputting information of at least one channel selected by the user from the signal output from the broadcast-signal processor, wherein said zapping-protocol processor receives digital broadcast signals for all the channels from the broadcast-signal processor, wherein a protocol for selecting a broadcast signal conforms to a related standard;
   a switch for opto-electrically converting the communication signal demultiplexed by the WDM optical demultiplexer, for electro-optically converting upstream information from the user to transfer the converted upstream information to the OLT, and for transferring the at least one channel selected by the user to the zapping-protocol processor; and,
   a convergence unit for outputting, in the form of the time slot-based optical signal, the signal selected by the user and outputted from the zapping-protocol processor and the communication-signal output from the switch.

2. The system as set forth in claim 1, wherein the OLT optically multiplexes broadcast signals into a synchronous-digital-hierarchy (SDH)/synchronous-optical-network (SONET) signal based on time-division multiplexing (TDM) and optically multiplexes communication signals into a Gigabit-Ethernet signal, and wherein TDM-based data is transmitted during broadcasting without using a complex modulation scheme.

3. The system as set forth in claim 1, wherein the user gateway is further operative to transmit upstream data sent by the user to the ONU.

4. The system as set forth in claim 1, wherein the ONU is further operative to process upstream data sent by the user.

5. The system as set forth in claim 1, wherein the broadcast-signal processor receives and opto-electrically converts an SDH/SONET optical signal from the WDM optical demultiplexer, then processes the opto-electrically converted signal on the basis of an MPEG2 multi-program transport stream (MPTS), and finally transfers the processed signal to the zapping-protocol processor.

6. The system as set forth in claim 5, wherein the SDH/SONET optical signal is a synchronous-transfer mode (STM)-n or synchronous-transfer signal level (STS)-n signal.

7. The system as set forth in claim 1, wherein the user gateway comprises:
   wherein the user gateway comprises:
   an input/output unit for opto-electrically converting the optical signal from the ONU and electro-optically converting upstream information from the user and transmitting the converted upstream information to the ONU;
   a time-slot separator for separating the signal output from the input/output unit into the broadcast signal and the communication signal;
   a distributor for distributing the broadcast signal from the time-slot separator to an external broadcast receiver and outputting the communication signal separated by the time-slot separator to a communication processor;
   the communication processor for transferring the communication signal from the time slot separator to the user and transferring the upstream information from the user to the input/output unit; and,
   a user-input unit for transferring information indicative of at least one broadcast channel selected by the user to the input/output unit.

* * * * *